June 16, 1942.  H. P. HOOD ET AL  2,286,275
METHOD OF TREATING BOROSILICATE GLASSES
Filed Sept. 10, 1940  2 Sheets-Sheet 1

INVENTORS.
HARRISON P. HOOD
AND MARTIN E. NORDBERG
BY
ATTORNEY.

June 16, 1942.  H. P. HOOD ET AL  2,286,275
METHOD OF TREATING BOROSILICATE GLASSES
Filed Sept. 10, 1940   2 Sheets-Sheet 2
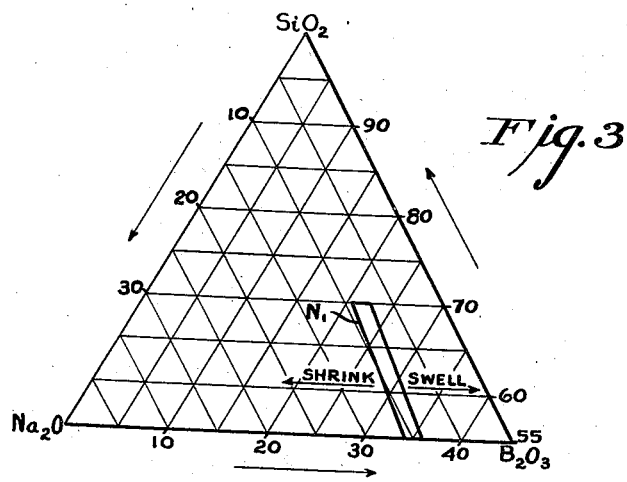
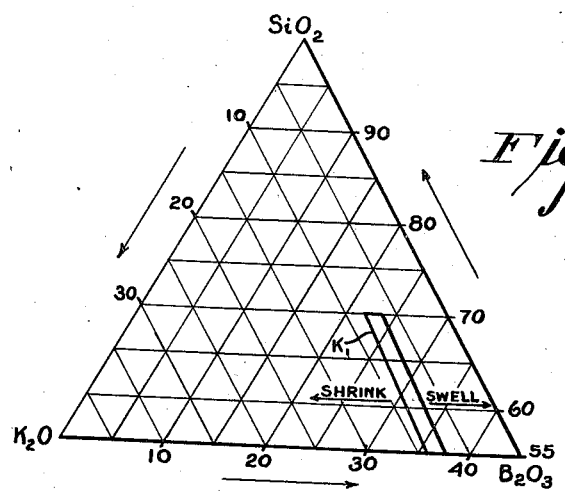
INVENTORS.
HARRISON P. HOOD
AND MARTIN E. NORDBERG
BY
ATTORNEY.

Patented June 16, 1942

UNITED STATES PATENT OFFICE 2,286,275

METHOD OF TREATING BOROSILICATE GLASSES

Harrison P. Hood and Martin E. Nordberg, Corning, N. Y., assignors to Corning Glass Works, Corning, N. Y., a corporation of New York Application September 10, 1940, Serial No. 356,228

5 Claims. (Cl. 49—79)

This application is a continuation in part of our copending applications Serial No. 744,818, filed September 20, 1934, and Serial No. 187,770, filed January 29, 1938. In our pending application, first above mentioned, there is described a process in which glass compositions in the ternary system $R_2O$—$B_2O_3$—$SiO_2$ are heat treated and thereafter leached with an acid solution to dissolve out the major portion of the boric oxide and alkali and leave an insoluble highly siliceous residue or skeleton which is submicroscopically porous and permeable to water and which retains the original shape of the initial glass. It is further shown that the highly siliceous article thus obtained can be heated slowly to dehydrate it and can subsequently be revitrified by heating to 900° C. or above to yield a transparent homogeneous article having a composition of approximately 5% $B_2O_3$, .5% $R_2O$, and the balance silica.

Under certain conditions during the acid leaching step of the above described process a swelling or shrinking of the glass occurs. Such swelling or shrinking establishes stresses in the glass which may become sufficiently large to cause cracking thereof before it has leached through. Such stresses practically disappear when leaching has progressed entirely through the glass.

The primary object of this invention is to prevent the development of substantial stress in the glass during the leaching step.

Another object is to facilitate the production of thick walled articles and ware of diverse shapes.

Another object is to introduce a substantial quantity of alumina into the glasses of the prior invention.

A further object is to produce silicate glass articles in which the alkali content of the final product may be reduced to substantially zero.

A still further object is to produce homogeneous, transparent articles of glasses having expansion coefficients ranging between those of pure silica and the lowest expansion silicate glasses heretofore made.

Another object is to improve and refine the process and increase its efficiency.

To these and other ends, the invention comprises various novel improvements in the method to be more fully set forth and described in the following specification and claims and illustrated in the accompanying drawings in which:

Fig. 3 is a graph on triangular coordinates representing a specific field of glass compositions in the ternary system $Na_2O$—$B_2O_3$—$SiO_2$.

Fig. 4 is a graph on triangular coordinates representing a specific field of glass compositions in the ternary system $K_2O$—$B_2O_3$—$SiO_2$.

We have discovered that the swelling and shrinking of the glass and hence the stresses set up thereby during the leaching step can be completely controlled or eliminated by selecting the initial glass composition from a specific narrow range of compositions preferably containing alumina as an additional constituent and heat treating it at 500° C. to 650° C. for a total of five minutes to 50 hours. The initial composition to be employed will depend upon the heat treatment intended and, conversely, the specific conditions of heat treatment will depend upon the composition. In other words, for a definite heat treatment the swelling or shrinking of the glass is a function only of the initial composition and for a definite initial composition it is a function of the temperature and time of heat treatment. For very long heat treatments the time factor is of no importance and swelling or shrinking becomes a function only of initial composition and temperature. Heat treatment is effective not only during the time that the glass is held at a definite temperature but is also effective during the time that the glass is cooling within the above recited range. Therefore time of heat treatment as referred to herein, unless otherwise specified, includes not only the time during which the glass is held at a definite constant temperature in the above stated range but includes also the time required for cooling to about 500° C. The swelling and shrinking of the glass is also affected by the temperature and strength of the leaching acid, although to a minor degree only, as will appear.

In describing the invention it is convenient to fix all variables with the exception of one in order to consider the permissible variations in the latter within the range of which little or no strain will be produced during leaching. Accordingly, the initial glass compositions will be considered for example with respect to a heat treatment at a constant temperature of 550° C.

for 20 hours followed by leaching with 3 normal hydrochloric or nitric acid at 90° C.

Figure 1:
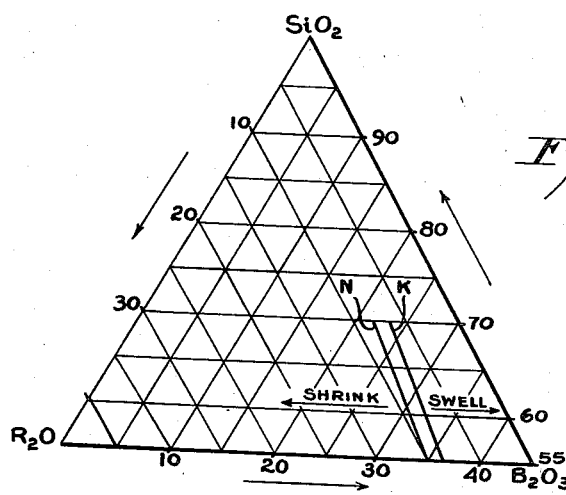
Fig. 1 is a graph on triangular coordinates which represents certain glass compositions of the ternary system $R_2O$—$B_2O_3$—$SiO_2$ where $R_2O$ is the alkali metal oxide $Na_2O$ or $K_2O$.

With the heat treatment and leaching factors thus fixed, we have found that for the three component system Na$_2$O—B$_2$O$_3$—SiO$_2$ the initial glass compositions which will develop no stress during leaching fall roughly on a straight line generally designated N in the triangular graph in Fig. 1, which line passes through and is defined by four points corresponding to the following compositions calculated from their batches:

|  | I | II | III | IV |
|---|---|---|---|---|
| SiO$_2$ | 55.0 | 60.0 | 65.0 | 70.0 |
| Na$_2$O | 10.0 | 9.5 | 9.0 | 8.5 |
| B$_2$O$_3$ | 35.0 | 30.5 | 26.0 | 21.5 |

Although the line N within the limits of experimental error represents compositions of glasses in which no stress will be developed under the above recited conditions, variations in these conditions will produce a slight deviation of the line, as will later appear. In general, glasses, the compositions of which are represented by points at the right of the line, will swell when subjected to the heat treating and leaching conditions noted above and glasses represented by points slightly at the left of the line will shrink under those conditions, as is indicated in Fig. 1. Glasses too far to the left will not leach. Swelling or shrinking on leaching will become more pronounced as the composition is further removed from the line. During leaching, swelling will cause tensional stress in the unleached portion of the glass and shrinking will cause tensional stress in the leached layer. Since breakage is caused by tensional stress rather than by compression and since the leached layer is inherently weaker than the unleached portion and further since surface flaws may cause further weakening, shrinking is more objectionable than swelling. A further disadvantage of shrinking is that, for a given silica content, it is in general accompanied by slower leaching. Compositions in this system, which are suitable for use under the above recited fixed conditions, are defined as those containing 55% to 70% SiO$_2$, (10 minus .1X) % Na$_2$O, X being the excess of silica over 55%, and the balance being B$_2$O$_3$.

In the above recited range of compositions, K$_2$O may be substituted wholly or in part for Na$_2$O, but in that case it is necessary also to decrease somewhat the ratio of alkali to boric oxide by weight. An example of such substitution is the following composition calculated from the batch in which Na$_2$O is completely substituted by K$_2$O:

V

| | |
|---|---|
| SiO$_2$ | 65.0 |
| K$_2$O | 7.5 |
| B$_2$O$_3$ | 27.5 |

In Fig. 1 a line K defines all compositions in the system K$_2$O—B$_2$O$_3$—SiO$_2$ which, on being heat treated and leached under the above recited fixed conditions, will develop substantially no stress in the glass during the leaching step. The same relationships apply to the line K as were described in the consideration of the line N. Compositions in this system which are suitable for use under the fixed conditions are defined as those containing 55% to 70% SiO$_2$, (8.5 minus .1X) % K$_2$O, X being the excess of silica over 55%, and the balance being B$_2$O$_3$.

Considering the two lines N and K, it will be noted that in each the silica contents vary from 55% to 70%, but in line K the alkali oxide varies from 7% to 8.5%, whereas in line N the alkali oxide content varies from 8.5% to 10%, the balance of the composition in each case being boric oxide. The compositions containing either one or both of the alkalies may be expressed as comprising 55% to 70% SiO$_2$ and (10 minus 1.5Y minus .1X) % R$_2$O, where R$_2$O is the total K$_2$O and Na$_2$O, Y is the ratio

and X is the excess SiO$_2$ over 55% and containing boric oxide.

It has now been found that alumina may be introduced into the above systems of glasses thereby making quaternary systems which can be leached with practically the same facility as the ternary systems even though they may contain as high as 4% of alumina. Moreover, a substantial amount of the alumina is retained in the insoluble siliceous residue thereby producing final glass compositions for which there is evidence that they are more stable against devitrification than the prior glasses. As pointed out in the prior copending application first above mentioned, the introduction of alumina reduces the rate at which leaching can take place, but it has been found that this rate can be restored by a sufficient reduction of the silica content within the limits of the field. In order to maintain zero strain the percentage of Na$_2$O must be decreased. The amount by which the percentage of Na$_2$O must be decreased for any given addition of Al$_2$O$_3$ within the range of .1–4% Al$_2$O$_3$ has been found to be proportional roughly to the square of the Al$_2$O$_3$ content and the proportionality factor is about .17. As the Al$_2$O$_3$ content is increased up the 4% the lower limit of the SiO$_2$ content is decreased in the proportion 1.25% SiO$_2$ for each per cent of Al$_2$O$_3$, and with a content of 4% Al$_2$O$_3$ the SiO$_2$ may be as low as 50%. Therefore, glasses in the quaternary system

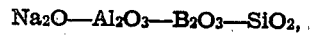

which will develop substantially no strain when heat treated and leached under the above recited fixed conditions, are confined to a range of compositions which may be defined by the following expression: (55 minus 1.25Z) % to 70% SiO$_2$, .1 to 4% Al$_2$O$_3$, (10 minus .1X minus .17Z$^2$) % Na$_2$O and the remainder B$_2$O$_3$, where Z is the percentage of Al$_2$O$_3$ and X is the excess of SiO$_2$ over 55%, it being understood that X is negative when the SiO$_2$ is less than 55%.

As mentioned above, a variation in the conditions of heat treating and leaching the glass will cause a variation in the results obtained with glass compositions represented by points on the lines N and K of Fig. 1 and the above defined range of compositions in the quaternary system. That is to say, the lines N and K represent glasses in which substantially no stress will be developed when they are heat treated at a constant temperature of 550° C. for 20 hours, and are subsequently leached in 3 normal acid at 90°. When the time and/or temperature of heat treatment are altered within limits, the points representing glasses, which will develop substantially no stress, will not fall exactly upon these lines but will be slightly removed therefrom and will fall at one side or the other of the lines as the case may be.

For example, when the time of heat treatment at 550° C. is extended beyond 20 hours, an increase in the $R_2O$ or $Al_2O_3$ or both for a given $B_2O_3$ content over the values represented in the above defined glass compositions is essential in order to avoid the development of stress during leaching and for heat treatments of less than 20 hours a decrease is essential. The temperature at which heat treatment is carried out will also affect the amount of stress developed during leaching and hence must be considered in connection with the time or duration of the heat treatment.

Figure 2:
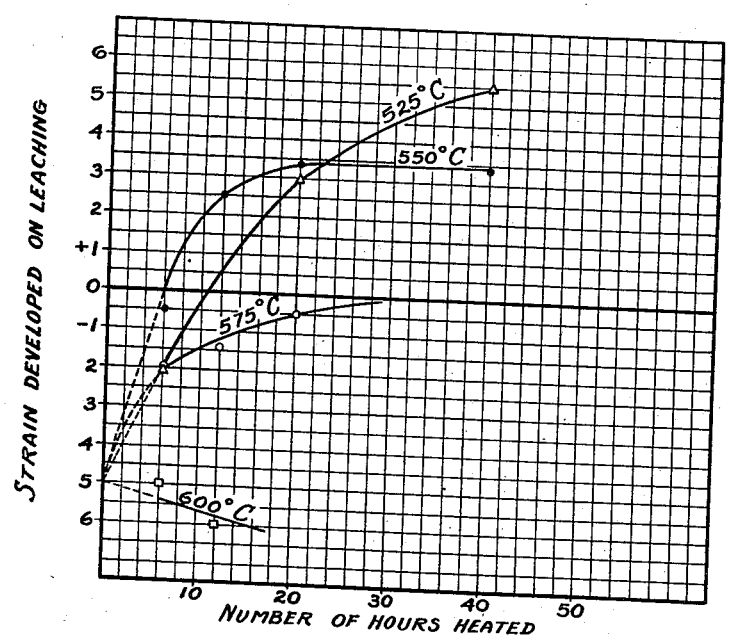
Fig. 2 is a plot showing the variation in arbitrary units of strain developed in the unleached portion of a glass of specific composition heat treated at various constant temperatures for different lengths of time.

An example of the relationship between time and temperature of heat treatment is shown in the curves of Fig. 2 which represent the results obtained on leaching a series of samples 1 mm. thick of a composition comprising 62.7% $SiO_2$, 6.6% $Na_2O$, 3.5% $Al_2O_3$ and 26.9% $B_2O_3$, as analyzed, which had previously been heated at the constant temperatures shown for various lengths of time. These curves represent the maximum strain in arbitrary units in the unleached portion of the sample during leaching, plotted against the time or duration of heating. A positive strain denotes a swelling of the glass on leaching and a negative strain denotes a shrinkage. The point on the strain axis through which the curves pass when extended represents the result obtained for this glass with no heat treatment other than that acquired during fabrication.

With the exception of the curve for 600° it will be noted that, as the duration of heat treatment increases, the leaching strain increases algebraically toward a maximum, which is different for each temperature chosen. As the temperature of heat treatment is decreased the maximum strain which can be attained becomes greater. However, with decreasing temperature the rate of change in the structure of the glass becomes slower, partly as a result of the increased viscosity. Hence the highest compression, that is, swelling, on leaching is obtained through the use of the lowest temperature of heat treatment, provided a sufficient length of time is employed. Temperatures lower than 500° C. require too long a time to be practical for the purpose of the present invention.

It will further be noted that as the temperature of heat treatment of this glass is increased the attainable maximum positive strain becomes less and for temperatures in the neighborhood of 600° C. only negative strain can be attained. On account of crazing with this glass the points for the curve for 600° C. are approximations. For this particular composition a constant temperature heat treatment at 600° C. would not be practical. However, with suitable compositions still higher temperatures up to about 650° C. may be employed.

Further inspection of the curves of Fig. 2 will show that this glass can be leached without the development of objectionable strain by employing any conditions of temperature and time represented by these and similar curves for intermediate temperatures where they intersect or closely approach the zero ordinate. For example, a heat treatment for about 20 hours or longer at about 575° C. will produce the desired result with this glass.

When heat treatment is not carried out at a constant temperature, that is, when the glass is cooled slowly the effect is as though successively lower constant temperatures had been employed. With sufficiently high initial temperatures and proper cooling rates such procedure will also produce the desired result. For example, substantially no strain will result when the glass referred to above is heated for three hours at 580° C. and is cooled through the critical range at about 25° per hour.

The variations in amount of strain caused by variations in time and temperature of heat treatment, which are described above for a glass of specific composition, are substantially the same in type for all compositions on and in the immediate neighborhood of the lines N and K shown in Fig. 1 and for compositions in the above defined quaternary system. Times and temperatures of heat treatment which cause positive strain on leaching may be compensated and substantially zero strain may result, despite such conditions, by shifting the composition of the glass to the left or in the direction of increasing tension as indicated in Fig. 1. Conversely times and temperatures of heat treatment which cause negative strain on leaching may be compensated by shifting the compositions to the right. In other words, conditions of heat treatment which would cause swelling on leaching require an increase in the $R_2O$ or $Al_2O_3$ or both for a given $B_2O_3$ content in order to prevent the development of strain on leaching, and conditions of heat treatment which would cause shrinking on leaching require a decrease.

From the above it will now be apparent that in the case of unavoidable variations in composition of the above defined glasses whereby, with a given heat treatment, strain would be developed during leaching, such variations in composition may be compensated by suitable variation in time and/or temperature of heat treatment and thus leaching may be carried out without the development of substantial strain. Such control constitutes one of the chief advantages of the invention because, despite the most rigid control of batch composition, appreciable variations in glass composition occur from one melt to the next and in a continuous tank the composition of the glass may vary appreciably from day to day. By the construction of curves as shown in Fig. 2, appropriate changes may be made in the time and/or temperature of heat treatment and the efficiency of production may thus be maintained at a high level.

The extent to which variations in the compositions of the above defined glasses may be compensated by varying the conditions of heat treatment or, in other words, the extent of the fields of compositions which can be leached without the development of substantial strain by suitable variation and control of the conditions of heat treatment are illustrated for the ternary systems in Figs. 3 and 4 by the areas within the parallelograms designated $N_1$ and $K_1$ respectively.

In Fig. 3 it will be seen that compositions falling within the area $N_1$ contain from 55% to 70% $SiO_2$ and from (10.5 minus .1X)% to (8.5 minus .1X)% $Na_2O$ where X is the excess of silica over 55%, the balance being $B_2O_3$.

In Fig. 4 the compositions falling within the area $K_1$ contain from 55% to 70% $SiO_2$ and from (9 minus .1X)% to (7.0 minus .1X)% $K_2O$ where X is the excess of silica over 55%, the balance being $B_2O_3$.

Considering the two areas $N_1$ and $K_1$ it will be noted that in each the silica contents vary from 55% to 70%, but in area $N_1$ the alkali oxide varies from 7.0% to 10.5%, whereas in the area K₁ the alkali oxide varies from 6% to 9%, the balance of the composition in each case being boric oxide. The compositions in these fields containing either or both of the alkalies may be expressed as comprising 55% to 70% $SiO_2$ and (10.5 minus 1.5Y minus .1X)% to (8.5 minus 1.5Y minus .1X)% $R_2O$, where $R_2O$ is the total $Na_2O$ and $K_2O$; Y is the ratio $$\frac{K_2O}{R_2O}$$

and X is the excess $SiO_2$ over 55%, and containing boric oxide.

For the quaternary system $$Na_2O—Al_2O_3—B_2O_3—SiO_2$$

the extent of the field of compositions is expressed as (55 minus 1.25Z)% to 70% $SiO_2$, .1 to 4% $Al_2O_3$, (10.5 minus .1X minus .17Z²)% to (8.5 minus .1X minus .17Z²)% $Na_2O$, and the remainder $B_2O_3$, where Z is the percentage of $Al_2O_3$ and X is the excess $SiO_2$ over 55%, X being negative when the $SiO_2$ is less than 55%. As an example, a composition in the field thus defined which we have found to be particularly suitable comprises

VI

| | Per cent |
|---|---|
| $SiO_2$ | 62.7 |
| $Na_2O$ | 6.6 |
| $Al_2O_3$ | 3.5 |
| $B_2O_3$ | 26.9 |

The third variable factor in the control of swelling and shrinking, as hereinbefore pointed out, is the leaching condition or principally the temperature and concentration of the leaching acid. This factor has relatively minor importance with regard to total swelling. A decrease in temperature of leaching will tend to increase the compressional stress in the leached layer slightly if the glass swells on leaching and will tend to decrease the tensional stress slightly if the glass shrinks on leaching. Increasing the concentration of acid will tend slightly to decrease the swelling on leaching. The choice of leaching conditions is governed by practical considerations and substantially zero strain for the chosen conditions is effected entirely by proper choice of glass composition and heat treatment. Thus for practical purposes the temperature of the leaching acid should be as high as possible, in order to insure the most rapid leaching. Increase of the acid concentration within limits also would increase the rate of leaching, but unfortunately this criterion cannot govern the choice of concentration because with high concentrations there is a tendency for the leached layer to spall or split off. This condition is aggravated by the accumulation of salts and boric acid in the leaching bath resulting from the reaction. Such condition becomes more critical as the thickness of the ware is increased. A concentration of about 1 normal gives satisfactory results.

In practicing the invention a composition falling within one of the above defined fields is melted in the usual manner and fabricated into ware. The heat treatment conditions suitable for the glass selected are ascertained by determining the relation between the amount of strain developed on leaching and the time and temperature of heat treatment as described above.

The articles are then heat treated under the conditions thus ascertained and are leached preferably under the condition of the highest temperature and concentration of the leaching bath that is compatible with the thickness of the article and are subsequently washed with water. The resulting glasses are porous in structure and may be vitrified by heating to a temperature in the neighborhood of 900° C. to 1200° C.

By means of the hereinbefore described process, we are able to produce articles of glass containing over 95% silica, from 0.02% to 0.25% alkali oxide and from 2% to 6% boric oxide. We have also succeeded in producing glasses consisting of over 94% $SiO_2$, 0.02% to 0.25% $Na_2O$, 0.3% to 2% $Al_2O_3$, and 2% to 6% $B_2O_3$. As an example of such a glass the following composition is given: 95.5% $SiO_2$, 0.05% $Na_2O$, 0.8% $Al_2O_3$, and 3.7% $B_2O_3$.

We claim:

1. The process which includes melting a glass containing 55% to 70% $SiO_2$ and (10.5 minus 1.5Y minus .1X)% to (8.5 minus 1.5Y minus .1X)% $R_2O$, and containing $B_2O_3$, where $R_2O$ is the total $Na_2O$ and $K_2O$, Y is the ratio $$\frac{K_2O}{R_2O}$$

and X is the excess of $SiO_2$ over 55%, fabricating the glass into a fixed shape, heating the article at a temperature between 500° C. and 650° C. for five minutes to 50 hours, and leaching the heat treated article in an acid solution.

2. The process which includes melting a glass containing (55 minus 1.25Z)% to 70% $SiO_2$, 0.1% to 4% $Al_2O_3$, (10.5 minus .1X minus .17Z²)% to (8.5 minus .1X minus .17Z²)% $Na_2O$ and containing $B_2O_3$, where Z is the percentage of $Al_2O_3$ and X is the excess of $SiO_2$ over 55%, X being negative when the $SiO_2$ is less than 55%, fabricating the glass into a fixed shape, heating the article at a temperature between 500° C. and 650° C. for five minutes to 50 hours, and leaching the heat treated article in an acid solution.

3. The process which includes melting a glass containing 55% to 70% $SiO_2$ and from (10.5 minus .1X)% to (8.5 minus .1X)% $Na_2O$, and containing $B_2O_3$, where X is the excess of $SiO_2$ over 55%, fabricating the glass into a fixed shape, heating the article at a temperature between 500° C. and 650° C. for five minutes to 50 hours, and leaching the heat treated article in an acid solution.

4. The process which includes melting a glass containing 55% to 70% $SiO_2$ and from (9 minus .1X)% to (7.0 minus .1X)% $K_2O$ and containing $B_2O_3$, where X is the excess of $SiO_2$ over 55%, fabricating the glass into a fixed shape, heating the article at a temperature between 500° C. and 650° C. for five minutes to 50 hours, and leaching the heat treated article in an acid solution.

5. The process which includes melting a glass comprising approximately 62.7% $SiO_2$, 6.6% $Na_2O$, 3.5% $Al_2O_3$ and 26.9% $B_2O_3$, fabricating the glass into a fixed shape, heating the article at about 580° C. for about 3 hours, cooling it at the rate of about 25 degrees per hour to below 550° C., then cooling it more rapidly to room temperature, and leaching the heat treated article in an acid solution.

HARRISON P. HOOD.
MARTIN E. NORDBERG.